United States Patent
Singh et al.

(10) Patent No.: US 9,301,295 B1
(45) Date of Patent: Mar. 29, 2016

(54) REDIRECTION OF WIRELESS COMMUNICATION DEVICES TO TARGET BASE STATIONS THAT SUPPORT REQUESTED MEDIA SESSIONS

(71) Applicant: Sprint Communications Company L.P., Overland Park, KS (US)

(72) Inventors: Jasinder Pal Singh, Olathe, KS (US); Maulik K. Shah, Overland Park, KS (US); Siddharth Oroskar, Overland Park, KS (US); Anoop Kumar Goyal, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 253 days.

(21) Appl. No.: 13/967,555

(22) Filed: Aug. 15, 2013

(51) Int. Cl.
*H04W 72/04* (2009.01)
*H04W 36/00* (2009.01)

(52) U.S. Cl.
CPC .......... *H04W 72/0426* (2013.01); *H04W 36/00* (2013.01)

(58) Field of Classification Search
None
See application file for complete search history.

(56) References Cited

U.S. PATENT DOCUMENTS

| | | | |
|---|---|---|---|
| 2009/0046656 A1* | 2/2009 | Kitazoe | H04W 36/0055 370/331 |
| 2010/0177739 A1* | 7/2010 | Huang | H04W 36/02 370/331 |
| 2012/0040662 A1 | 2/2012 | Rahman et al. | |
| 2012/0190363 A1* | 7/2012 | Maeda | H04W 48/02 455/435.1 |
| 2013/0017805 A1 | 1/2013 | Andre-Jonsson et al. | |
| 2013/0044613 A1* | 2/2013 | Edara | H04W 76/026 370/252 |
| 2013/0183981 A1 | 7/2013 | Singh et al. | |
| 2014/0162661 A1* | 6/2014 | Shaw | H04W 36/22 455/439 |
| 2014/0219246 A1* | 8/2014 | Khay-Ibbat | H04W 36/0022 370/331 |

* cited by examiner

*Primary Examiner* — Hassan Phillips
*Assistant Examiner* — Ayanah George

(57) ABSTRACT

In a wireless communication network, a network control system receives a request for a media session with a wireless communication device. The control system responsively determines if the wireless device is idle and determines if a source base station serving the wireless device can support the media session. If the wireless device is idle and the source base station does not support the media session, then the control system identifies a target base station to support the media session. The control system transfers a first redirect message for delivery to the wireless device through the source base station and transfers a second redirect message for delivery to the target base station. The redirect messages have session information for the media session. The target base station receives an acceptance of the media session from the wireless device and exchanges media for the media session responsive to the acceptance.

16 Claims, 8 Drawing Sheets

REDIRECTION OF WIRELESS COMMUNICATION DEVICES TO TARGET BASE STATIONS THAT SUPPORT REQUESTED MEDIA SESSIONS

TECHNICAL BACKGROUND

Wireless communication devices and wireless base stations communicate using several wireless protocols, such as Long Term Evolution (LTE), Code Division Multiple Access (CDMA), Global System for Mobile communications (GSM), EVolution Data Optimized (EVDO), and High Speed Packet Access (HSPA). Within these wireless protocols, there are further variations, such as Frequency Division Duplex (FDD) systems and Time Division Duplex (TDD) systems. Each of these wireless communication systems may have various different base station configurations to communicate with user communication equipment. Thus, there is a complex system of wireless base stations having varying capabilities and configurations.

Media sessions, such as video and voice calling, are supported in varying degrees by these base stations. In many cases, a serving or source base station may not support the type of media session that is being requested. For example, a given base station may not support a particular form of video or voice calling, such as Voice over LTE (VoLTE). Thus, the user cannot engage in the media session until they move to a different base station.

Many wireless communication systems have network control systems that redirect user communication devices from one base station to another. These network control systems may redirect user communication devices based on network conditions or user service requests. Unfortunately, the network control systems do not efficiently and effectively integrate their redirect capability with the base station capabilities and media session requests.

TECHNICAL OVERVIEW

In a wireless communication network, a network control system receives a request for a media session with a wireless communication device. The control system responsively determines if the wireless device is idle and determines if a source base station serving the wireless device can support the media session. If the wireless device is idle and the source base station does not support the media session, then the control system identifies a target base station to support the media session. The control system transfers a first redirect message for delivery to the wireless device through the source base station and transfers a second redirect message for delivery to the target base station. The redirect messages have session information for the media session. The target base station receives an acceptance of the media session from the wireless device and exchanges media for the media session responsive to the acceptance.

DETAILED DESCRIPTION

Figure 1:
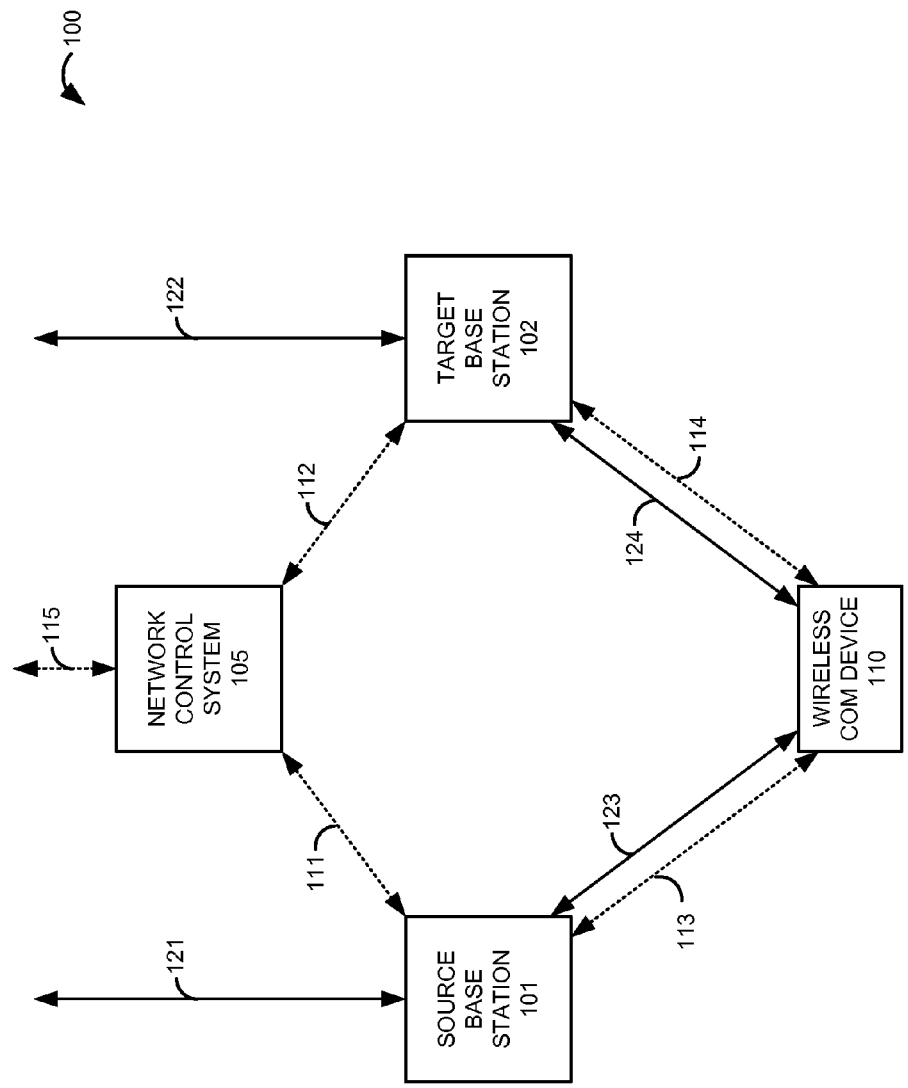
FIG. 1 illustrates a wireless communication network to redirect wireless communication devices to target base stations that support requested media sessions.

FIG. 1 illustrates wireless communication network 100 to redirect wireless communication device 110 to target base station 102 to support a requested media session. Wireless communication network 100 comprises source base station 101, target base station 102, network control system 105, and wireless communication device 110. Wireless communication network 100 is typically more complex, but has been simplified to illustrate innovative aspects. Some conventional aspects of wireless communication network 100 are omitted for clarity, such as enclosures, power supplies, and the like.

Source base station 101 and wireless communication device 110 exchange signaling and user traffic over signaling link 113 and traffic link 123 respectively. Source base station 101 exchanges signaling with network control system 105 over signaling link 111 and exchanges user traffic with other systems (not shown) over traffic links 121. Subsequently, target base station 102 and wireless communication device 110 exchange user traffic and signaling over signaling link 114 and traffic link 124 respectively. Target base station 102 exchanges signaling with network control system 105 over signaling link 112 and exchanges user traffic with other systems (not shown) over traffic links 122. Network control system 105 exchanges signaling, such as media session requests, with other systems (not shown) over signaling links 115.

Base stations 101-102, network control system 105, and wireless communication device 110 comprise communication circuitry and software to support one or more wireless communication protocols, such as LTE, CDMA, GSM, EVDO, and HSPA. Wireless communication device 110 might be a phone, computer, media player, wireless transceiver, and/or some other apparatus with wireless networking components. Wireless communication device 110 may be integrated within other systems and devices, such as vehicles, appliances, apparel, and the like.

In operation, network control system 105 receives a request for a media session with wireless communication device 110. Network control system 105 responsively determines if wireless communication device 110 is idle and if source base station 101 can support the media session. If wireless communication device 110 is idle and if source base station 101 cannot support the media session, then network control system 105 identifies proximate target base station 102 to support the media session. Network control system 105 transfers a first redirect message for delivery to wireless communication device 110 through the source base station 101 and transfers a second redirect message for delivery to target base station 102. The redirect messages have session information for the media session. Target base station 102 receives an acceptance of the media session from wireless communication device 110 and exchanges media for the media session responsive to the acceptance. Note that wireless communication device 110 transfers the media session acceptance to target base station 102 in response to a redirect message from source base station 101.

Figure 2:
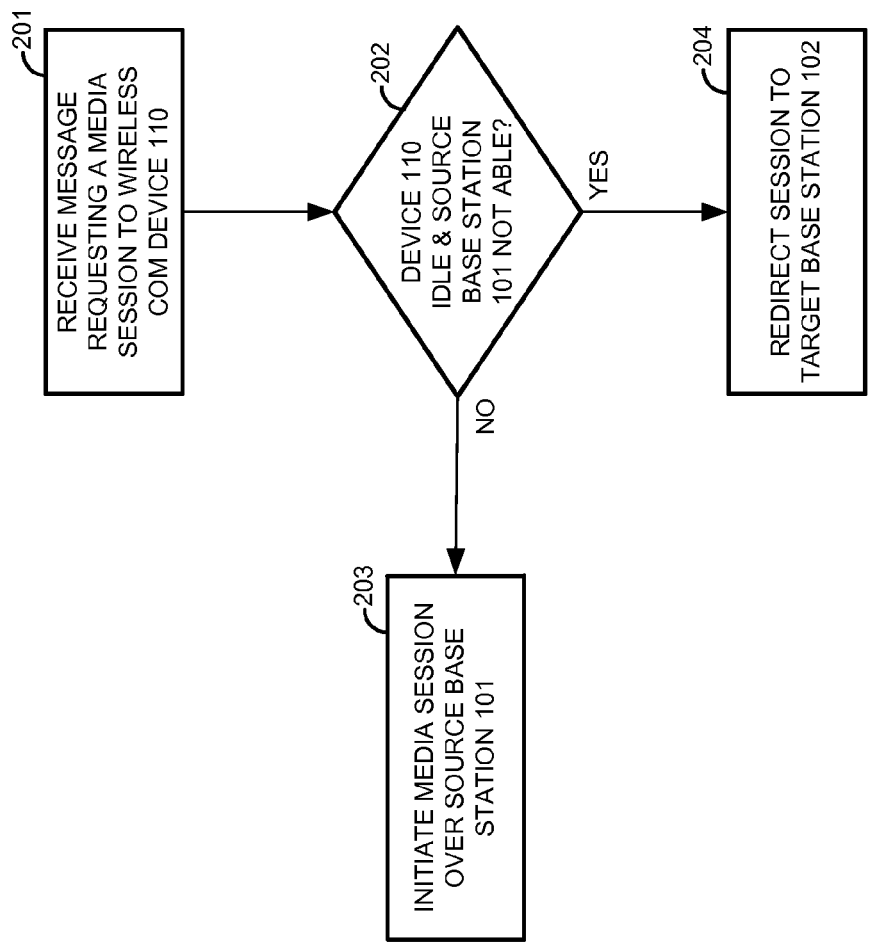
FIG. 2 illustrates the operation of a network control system to redirect wireless communication devices to target base stations that support requested media sessions.

FIG. 2 illustrates the operation of network control system 105 to redirect wireless communication device 110 to target base station 102 to support the requested media session. Network control system 105 receives a request for a media session with wireless communication device 110 (201). The media session request could be a VoLTE page or some other call set-up message. Network control system 105 responsively determines if wireless communication device 110 is idle and if source base station 101 can support the media session (202). A device is idle when it monitors signaling but does not have an active user traffic channel. The determination of a base station's media session capability may be based on a positive and/or negative base station list configured based on capability and configuration.

If source base station 101 can support the media session (202), then network control system 105 initiates the media session over source base station 101 in the normal manner (203). If communication device 110 is idle and if source base station 101 cannot support the media session (202), then network control system 105 redirects the media session to target base station 102 (204). The redirection entails transferring redirect messages with media session information for delivery to wireless communication device 110 and target base station 102.

Figure 3:
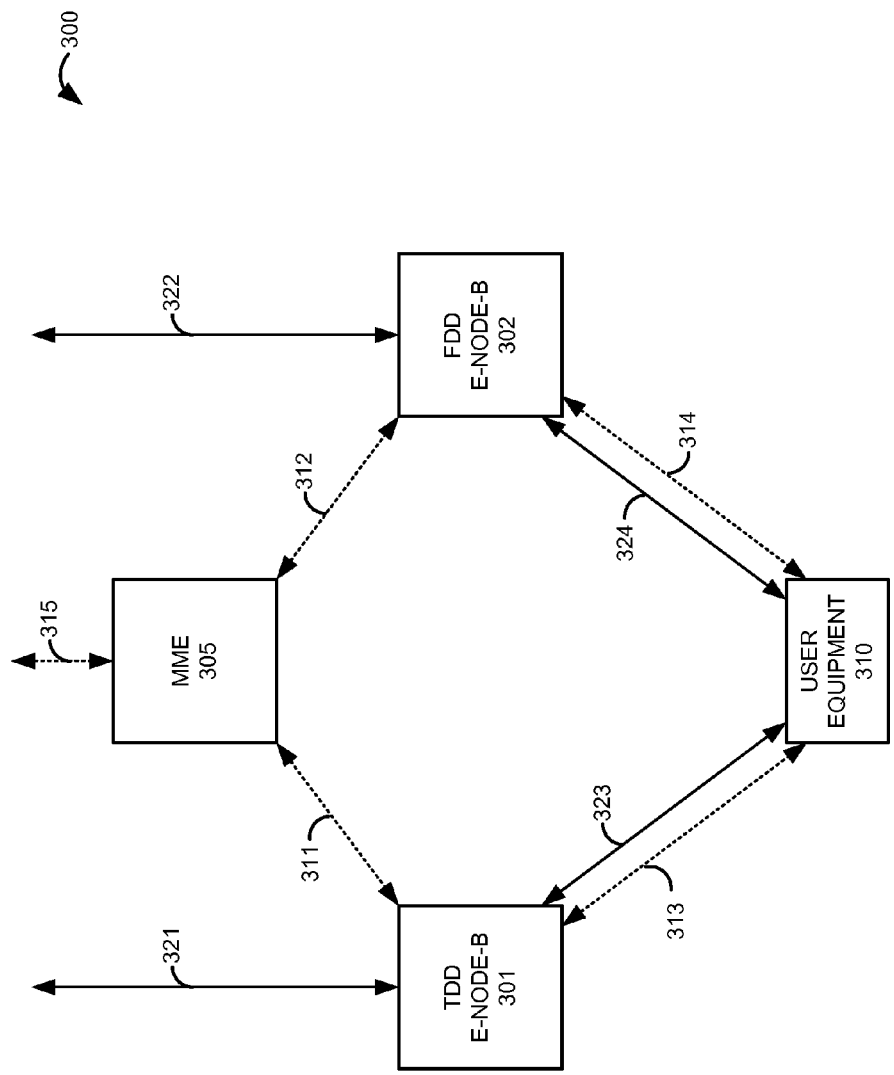
FIG. 3 illustrates an LTE communication network to redirect user equipment to target eNodeBs that support requested media sessions.

FIG. 3 illustrates LTE communication network 300 to redirect User Equipment (UE) 310 to FDD eNodeB 302 that supports a requested VoLTE session. LTE communication network 300 comprises TDD eNodeB 301, FDD eNodeB 302, Mobility Management Entity (MME) 305, and UE 310. TDD eNodeB 301 and UE 310 exchange signaling and user traffic over signaling link 313 and traffic link 323 respectively. TDD eNodeB 301 exchanges signaling with MME 305 over signaling link 311 and exchanges user traffic with other systems (not shown) over traffic links 321. Subsequently, FDD eNodeB 302 and UE 310 exchange signaling and user traffic over signaling link 314 and traffic link 324 respectively. FDD eNodeB 302 exchanges signaling with MME 305 over signaling link 312 and exchanges user traffic with other systems (not shown) over traffic links 322. MME 305 exchanges signaling with other systems (not shown) over signaling links 315.

Note that FDD eNodeB 302 supports particular types of media sessions, such as VoLTE calling. In contrast, TDD eNodeB 301 does not support these media session types. TDD eNodeB 301 does not support VoLTE calling.

In a VoLTE operation, MME 305 receives a page for a VoLTE call to UE 310. MME 305 responsively determines if UE 310 is idle and if TDD eNodeB 301 can support the VoLTE call. Since UE 310 is idle and TDD eNodeB 301 does not support VoLTE calls, MME 305 identifies proximate FDD eNodeB 302 to support the VoLTE call. MME 305 transfers a first redirect message for delivery to UE 310 through TDD eNodeB 301 and transfers a second redirect message for delivery to FDD eNodeB 302. TDD eNodeB 301 transfers the first redirect message to the UE 310. In response to the first redirect message from TDD eNodeB 301, UE 305 transfers an acceptance of the VoLTE call to FDD eNodeB 302. FDD eNodeB 302 receives the acceptance of the VoLTE call from UE 310 and exchanges voice data for the VoLTE call responsive to the acceptance.

Figure 4:
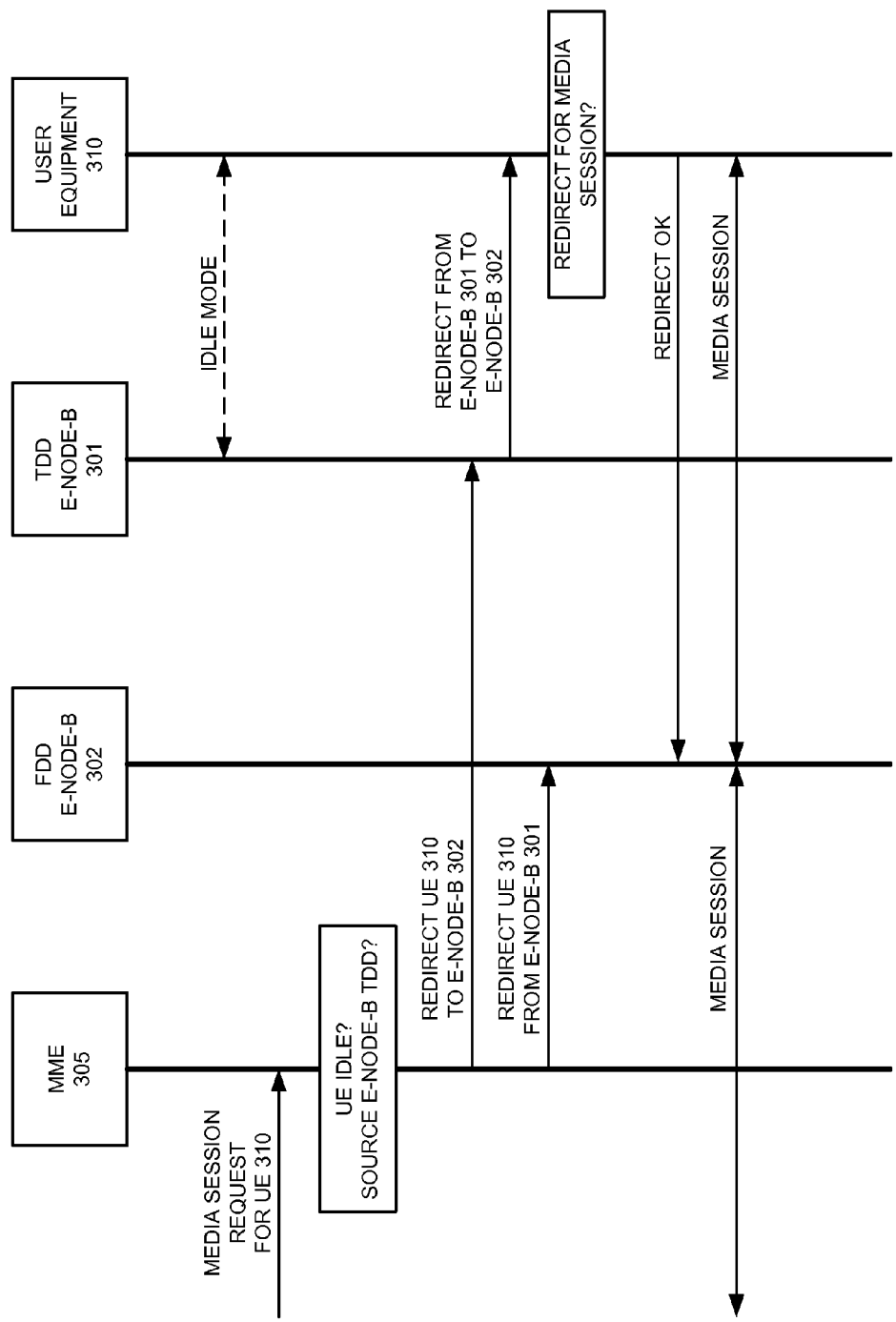
FIG. 4 illustrates the operation of the LTE communication network to redirect user equipment to target eNodeBs that support requested media sessions.

FIG. 4 illustrates the operation of LTE communication network 300 to redirect UE 310 to FDD eNodeB 302 to support a requested media session. Initially, UE 310 is in idle mode on TDD base station 301—the source base station. MME 305 receives a media session request for UE 310. The session request could be a VoLTE page indicating a "conversational call"—although other types of media sessions, pages, and session indicators could be used as desired.

MME 305 determines if UE 310 is in idle mode and if TDD eNodeB 301 can handle the requested media session. Some TTD LTE systems, such as eNodeB 301, do not support some forms of media calling, such as VoLTE. Since UE 310 is idle and eNodeB 301 does not support the media session, MME 305 identifies proximate FDD eNodeB 302 to handle the media session and sends redirect messages to TDD eNodeB 301 and FDD eNodeB 302. TDD eNodeB 301 transfers a version of the redirect message to UE 310. These redirect messages may include various information for the media session, such as session type, caller ID, FDD eNodeB 302 data, frequency carrier data, signaling/traffic channel data, preambles, and the like.

UE 310 processes the redirect message to determine if it will redirect to FDD eNodeB 302 for the requested media session. This could entail processing configuration data, such as an instruction to redirect when idle. This might entail a prompt to the user for instructions, such as a call alert and the resulting user input to answer the call. In this example, UE 310 determines to redirect to FDD eNodeB 302 for the media session and transfers a redirect OK message to NodeB 302. The redirect OK message may include session data, such as an answer instruction, coding schemes, and the like. UE 315 then engages in the media session through FDD eNodeB 302.

Figure 5:
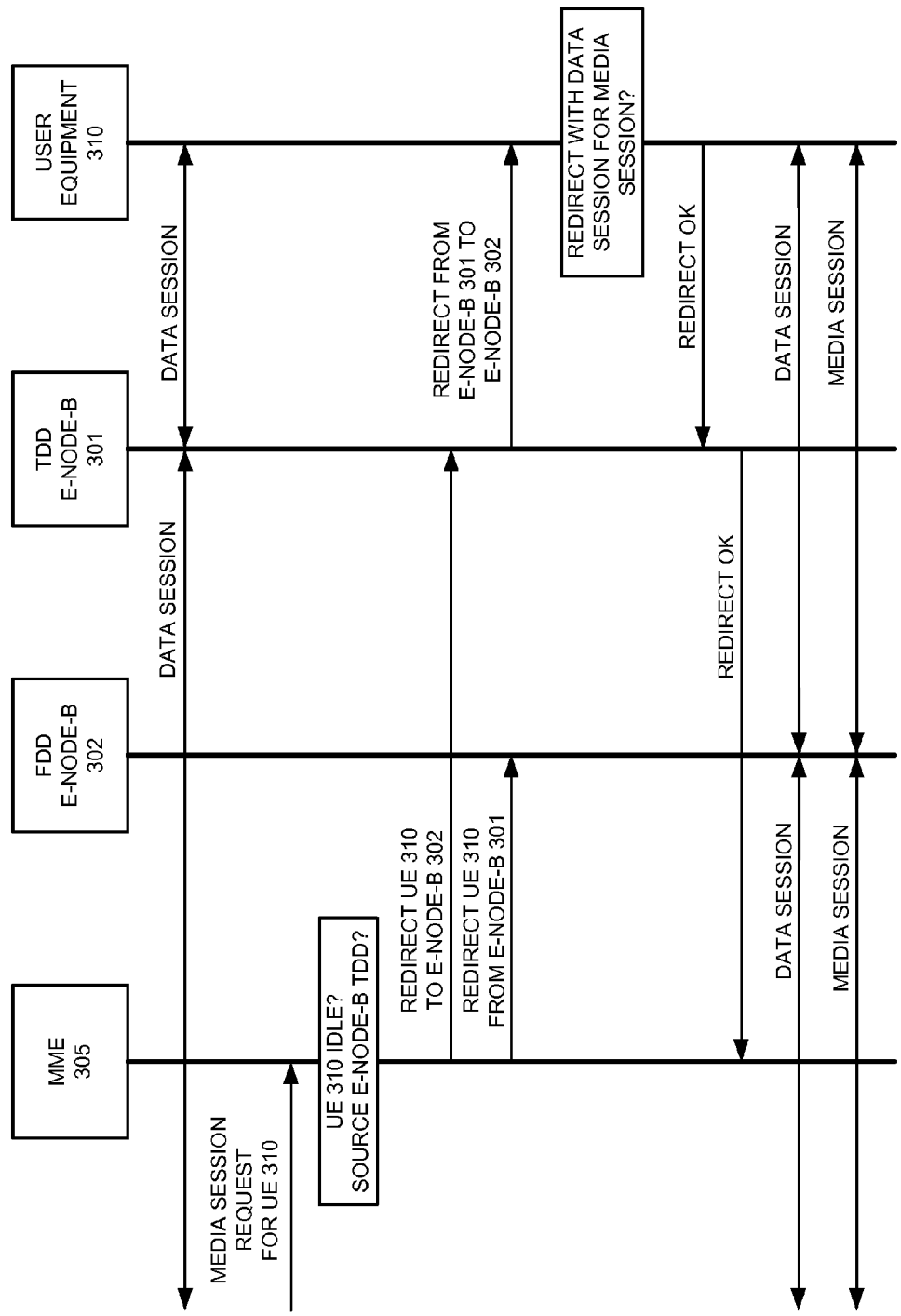
FIG. 5 illustrates the operation of the LTE communication network to redirect user equipment to target eNodeBs that support requested media sessions when the user equipment have currently active data sessions.

FIG. 5 illustrates the operation of LTE communication network 300 to redirect UE 310 to FDD eNodeB 302 to support the requested media session when UE 310 has a currently active data session. Initially, UE 310 is in active mode and engaging in a data session through TDD eNodeB 301—the source base station. MME 305 receives a media session request for UE 310. The session request could be a VoLTE page indicating a "conversational call"—although other types of media sessions, pages, and session indicators could be used as desired.

MME 305 determines if UE 310 is in idle mode and if TDD eNodeB 301 can handle the requested media session. Some TTD LTE systems, such as eNodeB 301, do not support some forms of media calling. Since UE 310 is active and eNodeB 301 does not support the media session, MME 305 identifies proximate FDD eNodeB 302 to handle both the data session and the media session. MME 305 sends redirect messages to TDD eNodeB 301 and FDD eNodeB 302. TDD eNodeB 301 transfers a version of the redirect message to UE 310. These redirect messages may include various information for the media session, such as session type, caller ID, FDD eNodeB 302 data, frequency carrier data, signaling/traffic channel data, preambles, and the like.

UE 310 processes the redirect message to determine if it will redirect to FDD eNodeB 302 for the current data session and the requested media session. This could entail processing configuration data, such as an instruction to redirect when at a certain location. This might entail a prompt to the user for instructions, such as a call alert and the resulting user input to answer the call. In this example, UE 310 determines to redirect to FDD eNodeB 302 for the data session and the media session and transfers a redirect OK message to eNodeB 302.

The redirect OK message may include session data, such as an answer instruction, coding schemes, and the like. MME 305 transfers the current data session to FDD eNodeB 302 and establishes the media session through FDD eNodeB 302. UE 310 then engages in the data session and the media session through FDD eNodeB 302. Note that other systems, such as a Packet Gateway (P-GW) and/or Serving Gateway (S-GW) may also assist in the data session transfer in their normal manner.

Figure 6:
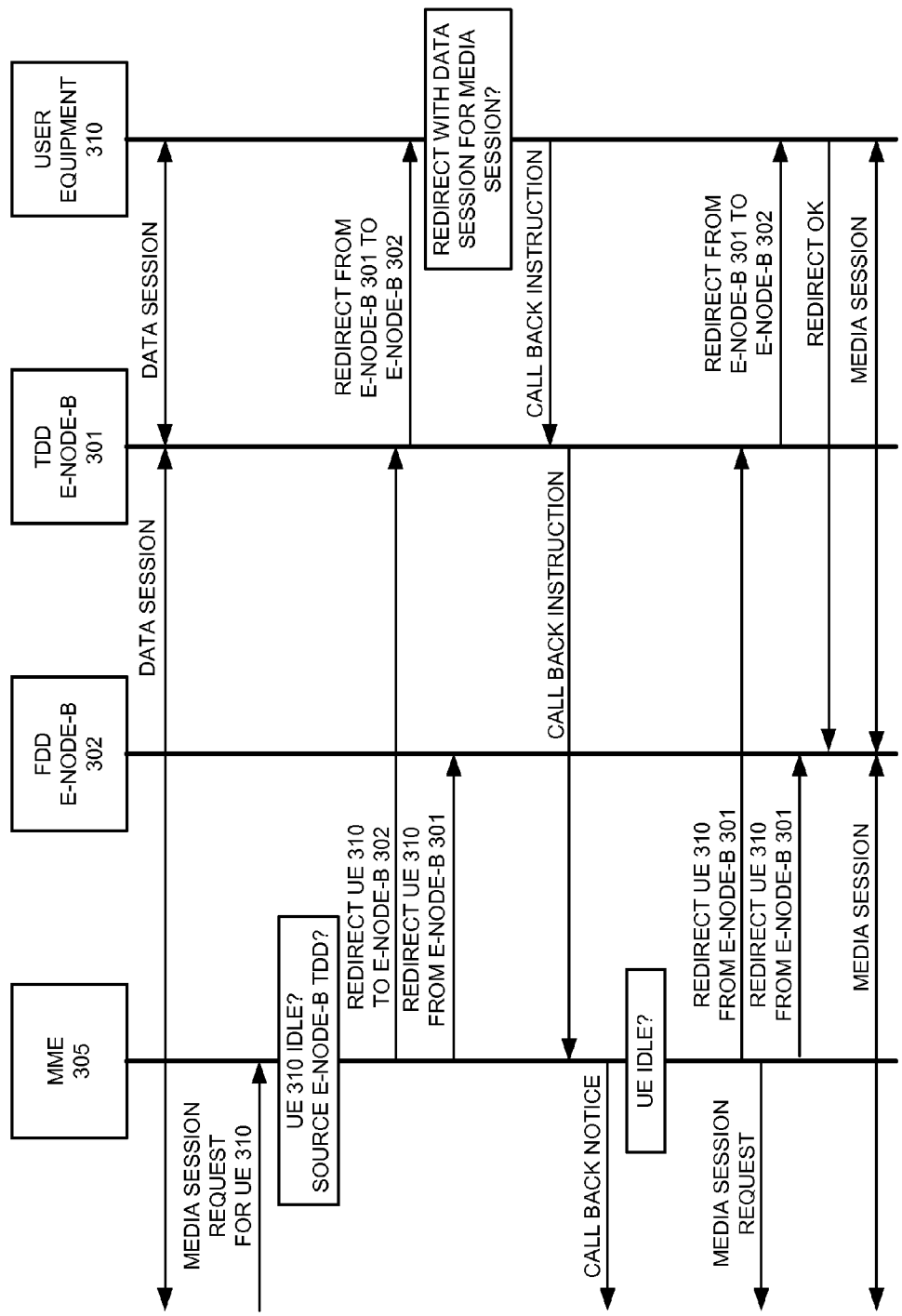
FIG. 6 illustrates the operation of the LTE communication network to redirect user equipment to target eNodeBs that support requested media sessions after the user equipment terminates active data sessions.

FIG. 6 illustrates the operation of LTE communication network 300 to redirect UE 310 to target eNodeB 302 to support the requested media session after UE 310 terminates a currently active data session. Initially, UE 310 is in active mode and engaging in a data session through TDD eNodeB 301—the source base station. MME 305 receives a media session request for UE 310. The session request could be a VoLTE page indicating a "conversational call"—although other types of media sessions, pages, and session indicators could be used as desired.

MME 305 determines if UE 310 is in idle mode and if TDD eNodeB 301 can handle the requested media session. Some TTD LTE systems, such as eNodeB 301, do not support some forms of media calling. Since UE 310 is active and TDD eNodeB 301 does not support the media session, MME 305 identifies proximate FDD eNodeB 302 to handle the data session and the media session. MME 305 sends redirect messages to TDD eNodeB 301 and FDD eNodeB 302. TDD eNodeB 301 transfers a version of the redirect message to UE 310. These redirect messages may include various information for the media session, such as session type, caller ID, FDD eNodeB 302 data, frequency carrier data, signaling/traffic channel data, preambles, and the like.

UE 310 processes the redirect message to determine if it will redirect to FDD eNodeB 302 for the current data session and the requested media session. This could entail processing configuration data, such as an instruction to redirect when at a certain location. This might entail a prompt to the user for instructions, such as a call alert and the resulting user input to call back after the data session. In this example, UE 310 determines to redirect to FDD eNodeB 302 for the media session after the data session terminates. UE 310 transfers a call back instruction for this service to TDD eNodeB 301, and NodeB 301 transfers the call back instruction to MME 305. The call back instruction may include session data, such as calling instructions, coding schemes, and the like.

In response to the call back instruction, MME 305 transfers a call back notice to the system that made the original media session request. The call back notice indicates that the media session will be re-initiated after a time period—perhaps specified by the user of UE 310 in the call back instruction.

MME 305 monitors UE 310 for a return to idle mode. When UE 310 goes idle, MME 305 transfers additional redirect messages to TDD eNodeB 301 and FDD eNodeB 302. TDD eNodeB 301 transfers a version of this additional redirect message to UE 310. These redirect messages may include various information for the media session, such as session type, caller ID, FDD eNodeB 302 data, frequency carrier data, signaling/traffic channel data, preambles, and the like. MME 305 also transfers a new media session request to the original requesting system. Based on the call back instruction and the additional redirect message, UE 310 transfers a redirect OK message to eNodeB 302. The redirect OK message may include session data, such as an answer instruction, coding schemes, and the like. MME 305 establishes the media session through FDD eNodeB 302. UE 310 then engages in the media session through FDD eNodeB 302.

Figure 7:
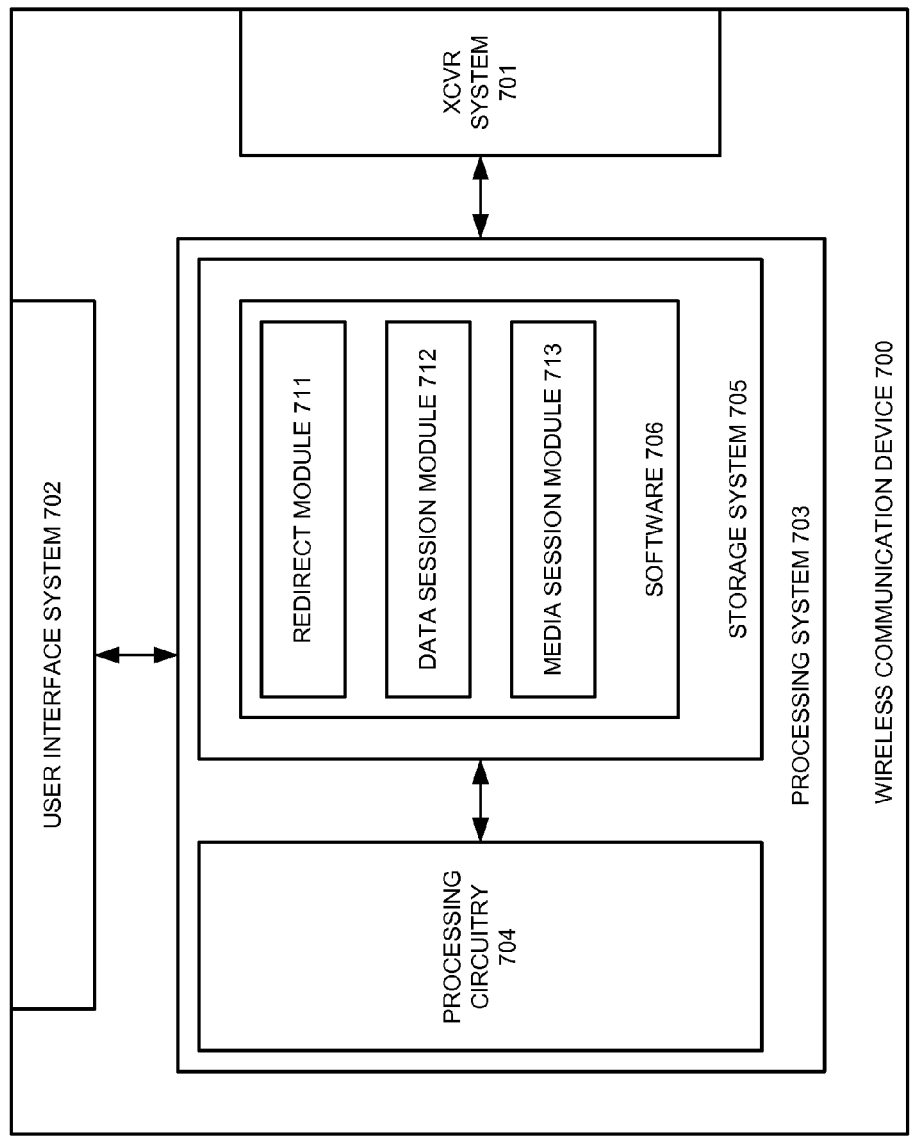
FIG. 7 illustrates a wireless communication device that redirects to target base stations that support requested media sessions.

FIG. 7 illustrates wireless communication device 700 that redirects to target base stations that support requested media sessions. Wireless communication device 700 is an example of the wireless communication device 110 and UE 310, although these devices may use alternative configurations. Wireless communication device 700 comprises transceiver system 701, user interface system 702, and processing system 703. Processing system 703 comprises processing circuitry 704 and storage system 705. Storage system 705 stores software 706. Wireless communication device 700 may be integrated within other systems and may be distributed across multiple diverse computer and communication systems. Some conventional aspects of wireless communication device 700 are omitted for clarity, such as power supplies, enclosures, and the like.

Transceiver system 701 comprises communication components, such as antennas, ports, filters, amplifiers, circuitry, memory, software, and the like. Transceiver system 701 uses protocols such as LTE, CDMA, GSM, EVDO, HSPA, WIFI, or some other communication format. Transceiver system 701 wirelessly communicates over signaling links and traffic links as described herein to receive redirect messages, transfer redirect OK messages, transfer call back messages, and engage in wireless data and media sessions.

User interface system 702 comprises displays, touchscreens, speakers, microphones, vibrators, switches, buttons, lights, and/or some other human-to-machine interfaces.

Processing circuitry 704 comprises circuit boards that hold integrated circuitry and associated electronics. Storage system 705 comprises non-transitory, machine-readable, data storage media, such as flash drives, disc drives, and the like. Software 706 comprises machine-readable instructions that control the operation of processing circuitry 704 when executed. Software 706 includes modules 711-713 and may also include operating systems, applications, utilities, databases, and the like. All or portions of software 706 may be externally stored on flash drives, discs, servers, and the like.

When executed by processing circuitry 704, redirect module 711 directs circuitry 704 to process redirect requests and provide redirect OK messages or call back instructions as described herein. When executed by processing circuitry 704, data session module 712 directs circuitry 704 to engage in data sessions as described herein. When executed by processing circuitry 704, media session module 713 directs circuitry 704 to engage in media sessions as described herein.

Figure 8:
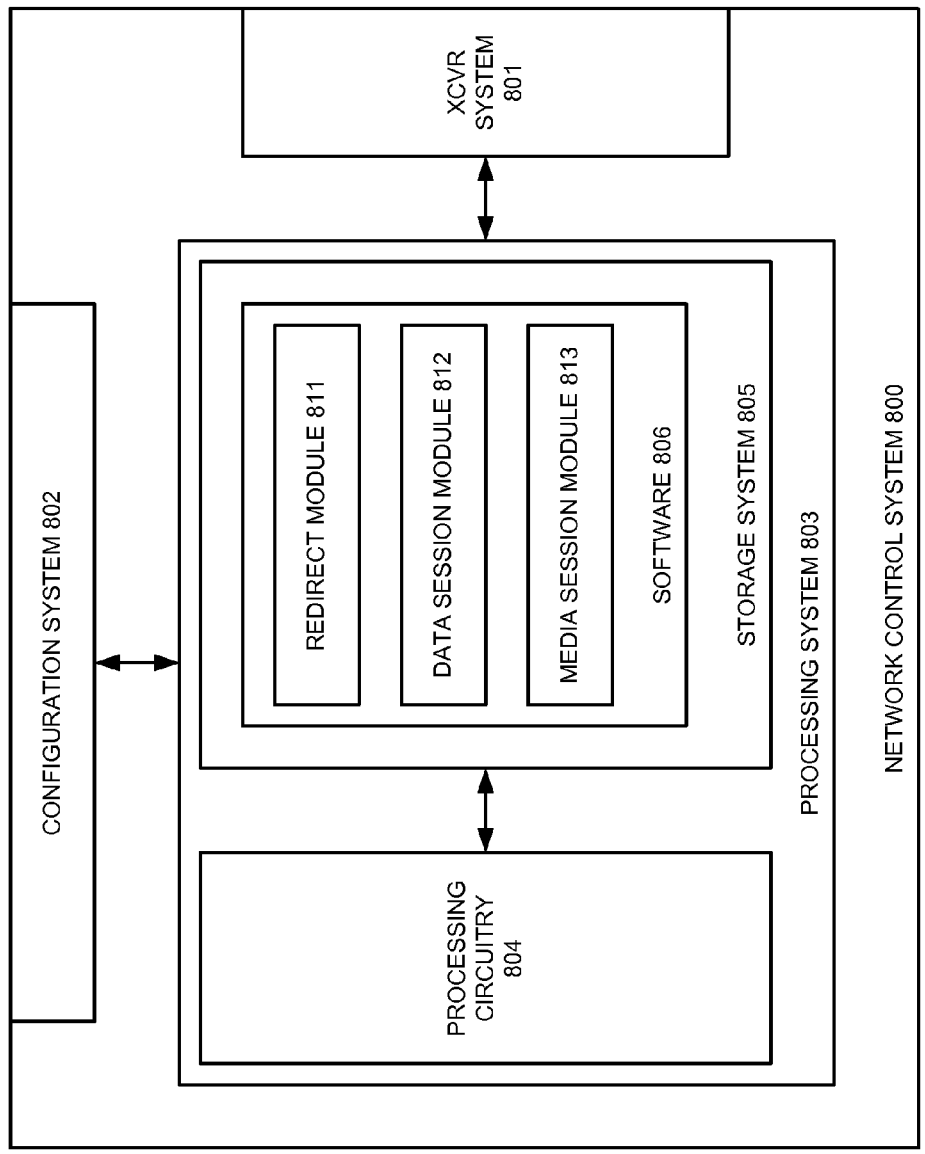
FIG. 8 illustrates a network control system to redirect wireless communication devices to target base stations that support requested media sessions.

FIG. 8 illustrates network control system 800 to redirect wireless communication devices to target base stations that support requested media sessions. Network control system 800 is an example of the network control system 105 and MME 305, although systems 105 and 305 may use alternative configurations. Network control system 800 comprises transceiver system 801, configuration system 802, and processing system 803. Processing system 803 comprises processing circuitry 804 and storage system 805. Storage system 805 stores software 806. Network control system 800 may be integrated within other systems and may be distributed across multiple diverse computer and communication systems. Some conventional aspects of Network control system 800 are omitted for clarity, such as power supplies, enclosures, and the like.

Transceiver system 801 comprises communication components, such as ports, circuitry, memory, software, and the like. Transceiver system 801 uses protocols such as LTE, CDMA, GSM, EVDO, HSPA, or some other communication format. Transceiver system 801 establishes processes media session requests and associated redirect signaling as described herein.

Configuration system 802 comprises a programming interface to receive data, such as base station capabilities and redirect information.

Processing circuitry 804 comprises circuit boards that hold integrated circuitry and associated electronics. Storage system 805 comprises non-transitory, machine-readable, data storage media, such as flash drives, disc drives, and the like. Software 806 comprises machine-readable instructions that control the operation of processing circuitry 804 when executed. Software 806 includes modules 811-813 and may also include operating systems, applications, utilities, databases, and the like. All or portions of software 806 may be externally stored on flash drives, discs, servers, and the like.

When executed by processing circuitry 804, redirect module 811 directs circuitry 804 to process media session requests and handle redirect messaging and call back instructions as described herein. When executed by processing circuitry 804, data session module 812 directs circuitry 804 to redirect data sessions as described herein. When executed by processing circuitry 804, media session module 813 directs circuitry 804 to redirect media sessions as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication network comprising:
   in a network control system, receiving a request for at least one of a data or media session with a wireless communication device, and in response, determining if the wireless communication device is idle and determining if a source base station that currently serves the wireless communication device is configured to support the at least one of the data or media session;
   in the network control system, if the wireless communication device is idle and the source base station is not capable of supporting the media session, then identifying a target base station that is configured to support the media session and transferring a first redirect message for delivery to the wireless communication device through the source base station and transferring a second redirect message for delivery to the target base station, wherein the first redirect message and the second redirect message have session information for the media session;
   in the network control system, if the wireless communication device is not idle and the source base station is not capable of supporting the data session, then identifying a target base station that is configured to support the data session and transferring a first redirect message for delivery to the wireless communication device through the source base station and transferring a second redirect message for delivery to the target base station, wherein the first redirect message and the second redirect message have session information for the data session;
   in the source base station, transferring the first redirect message to the wireless communication device;
   in the target base station, receiving an acceptance of the at least one of the data or media session from the wireless communication device and exchanging data or media for the at least one of the data or media session responsive to the acceptance.

2. The method of claim 1 wherein the wireless communication device transfers the acceptance of the at least one of the data or media session to the target base station responsive to the session information in the first redirect message from the source base station.

3. The method of claim 1 further comprising:
   in the source base station, receiving a call back instruction from the wireless communication device responsive to the session information in the first redirect message and transferring the call back instruction for delivery to the network control system;
   in the network control system responsive to the call back instruction, transferring a call back notice for delivery to a remote system that transferred the media session request.

4. The method of claim 1 further comprising:
   in the source base station, receiving a call back instruction from the wireless communication device responsive to the session information in the first redirect message and transferring the call back instruction for delivery to the network control system;
   in the network control system, detecting when the current data session terminates, and in response to the data session termination and the call back instruction, transferring call initiation messages for delivery to the wireless communication device and to a remote system that transferred the media session request.

5. The method of claim 4 wherein the wireless communication device transfers the acceptance of the media session to the target base station responsive to one of the call initiation messages from the network control system.

6. The method of claim 1 wherein the source base station comprises a Long Term Evolution (LTE) eNodeB configured for Time Division Duplex (TDD) communications and wherein the target base station comprises a Long Term Evolution (LTE) eNodeB configured for Frequency Division Duplex (FDD) communications.

7. The method of claim 1 wherein the network control system comprises a Long Term Evolution (LTE) Mobility Management Entity (MME).

8. The method of claim 1 wherein the media session comprises a Voice over Long Term Evolution (VoLTE) call.

9. A wireless communication network comprising:
   a network control system configured to receive a request for at least one of a data or media session with a wireless communication device, and in response, determine if the wireless communication device is idle and determine if a source base station that currently serves the wireless communication device is configured to support the at least one of the data or media session;
   the network control system further configured, if the wireless communication device is idle and the source base station is not capable of supporting the media session, to identify a target base station that is configured to support the media session, transfer a first redirect message for delivery to the wireless communication device through the source base station, and transfer a second redirect message for delivery to the target base station, wherein the first redirect message and the second redirect message have session information for the media session;
   the network control system further configured, if the wireless communication device is not idle and the source base station is not capable of supporting the data session, to identify a target base station that is configured to support the data session, transfer a first redirect message for delivery to the wireless communication device through the source base station, and transfer a second redirect message for delivery to the target base station, wherein the first redirect message and the second redirect message have session information for the data session;

the source base station configured to transfer the first redirect message to the wireless communication device;

the target base station configured to receive an acceptance of the at least one of the data or media session from the wireless communication device and to exchange data or media for the at least one of the data or media session responsive to the acceptance.

10. The wireless communication system of claim 9 wherein the wireless communication device transfers the acceptance of the at least one of the data or media session to the target base station responsive to the session information in the first redirect message from the source base station.

11. The wireless communication system of claim 9 wherein:

the source base station is configured to receive a call back instruction from the wireless communication device responsive to the session information in the first redirect message and transfer the call back instruction for delivery to the network control system;

the network control system is configured, responsive to the call back instruction, to transfer a call back notice for delivery to a remote system that transferred the media session request.

12. The wireless communication system of claim 9 wherein:

the source base station is configured to receive a call back instruction from the wireless communication device responsive to the session information in the first redirect message and transfer the call back instruction for delivery to the network control system;

the network control system is configured to detect when the current data session terminates, and in response to the data session termination and the call back instruction, to transfer call initiation messages for delivery to the wireless communication device and to a remote system that transferred the media session request.

13. The wireless communication system of claim 12 wherein the wireless communication device transfers the acceptance of the media session to the target base station responsive to one of the call initiation messages from the network control system.

14. The wireless communication system of claim 9 wherein the source base station comprises a Long Term Evolution (LTE) eNodeB configured for Time Division Duplex (TDD) communications and wherein the target base station comprises a Long Term Evolution (LTE) eNodeB configured for Frequency Division Duplex (FDD) communications.

15. The wireless communication system of claim 9 wherein the network control system comprises a Long Term Evolution (LTE) Mobility Management Entity (MME).

16. The wireless communication system of claim 9 wherein the media session comprises a Voice over Long Term Evolution (VoLTE) call.

\* \* \* \* \*